United States Patent [19]

Litchford et al.

[11] Patent Number: 4,899,156
[45] Date of Patent: Feb. 6, 1990

[54] VIRTUAL ATCRBS USING SIGNALS OF REMOTE SSR

[75] Inventors: George B. Litchford, Northport; Burton L. Hulland, Glenwood Landing, both of N.Y.

[73] Assignee: Litchstreet Company, Northport, N.Y.

[21] Appl. No.: 379,651

[22] Filed: Jul. 13, 1989

Related U.S. Application Data

[63] Continuation of Ser. No. 65,779, Jun. 24, 1987, abandoned.

[51] Int. Cl.$^4$ .............................................. G01S 13/74
[52] U.S. Cl. ....................................... 342/37; 342/32; 364/461
[58] Field of Search ................................ 342/36–38, 342/40–43, 386, 53, 29–32, 458, 461; 364/429, 456, 461; 340/903, 961

[56] References Cited

U.S. PATENT DOCUMENTS

| | | | |
|---|---|---|---|
| 3,875,570 | 4/1975 | Litchford | 342/38 |
| 4,027,307 | 5/1977 | Litchford | 342/38 |
| 4,115,771 | 9/1978 | Litchford . | |
| 4,196,434 | 4/1980 | Funatsu et al. | 342/32 |
| 4,642,648 | 2/1987 | Hulland et al. | 342/45 X |
| 4,733,241 | 3/1988 | Litchford et al. . | |

Primary Examiner—Thomas H. Tarcza
Assistant Examiner—Tod Swann
Attorney, Agent, or Firm—Henry S. Huff

[57] ABSTRACT

A virtual secondary surveillance radar (SSR) of the type described in U.S. Pat. No. 4,115,771 can produce inaccurate or indeterminate range information for a transponder positioned near or on a line between the actual SSR and the virtual SSR, owing to unfavorable geometrical relationships. When such condition occurs, the error or ambiguity is resolved by transmitting interrogations from the virtual SSR site toward the actual SSR. The time delay between transmission of an interrogation and reception of a reply to it is a direct measure of the range of the transponder from the virtual SSR.

16 Claims, 1 Drawing Sheet

VIRTUAL ATCRBS USING SIGNALS OF REMOTE SSR

This application is a continuation of application Ser. No. 65,779, filed on 6-24-87 now abandoned.

BACKGROUND OF THE INVENTION

This invention relates to radio location, as of mobile vehicles such as aircraft equipped with transponders, and more particularly to improvements on the invention disclosed in U.S. Pat. No. 4,115,771.

The system disclosed in U.S. Pat. No. 4,115,771 provides essentially all the information that would be available with an actual Secondary Surveillance Radar (SSR) located at the site of the virtual SSR, described in said patent, without transmitting signals and at a fraction of the cost of an actual SSR. Neither the virtual SSR nor the actual SSR are required to remain at fixed locations; their current positions may be determined continuously by known means such as Loran C, enabling the system to operate from mobile bases such as AWACS aircraft, for example.

Under certain conditions that occur rarely and are usually quite transient, the information regarding range of a target craft from the virtual SSR can become inaccurate or indeterminate. In an extraordinary case in which such conditions prevail for more than a few seconds, the situation could be troublesome, particularly if two or more target aircraft at the same altitude are involved.

SUMMARY OF THE INVENTION

According to the present invention, the above mentioned condition is sensed at the virtual SSR station, activating transmission therefrom of several interrogations in Air Traffic Control Radio Beacon System (ATCRBS) format, in a narrow directive pattern pointed at the actual SSR. This provides the virtual SSR station with active range information regarding any transponder equipped craft on or near the line between the actual and virtual SSRs. The active range is displayed at the virtual SSR station together with other positional information passively derived as described in said U.S. Pat. No. 4,115,771.

DESCRIPTION OF EXEMPLARY EMBODIMENTS

Figures 1, 2:
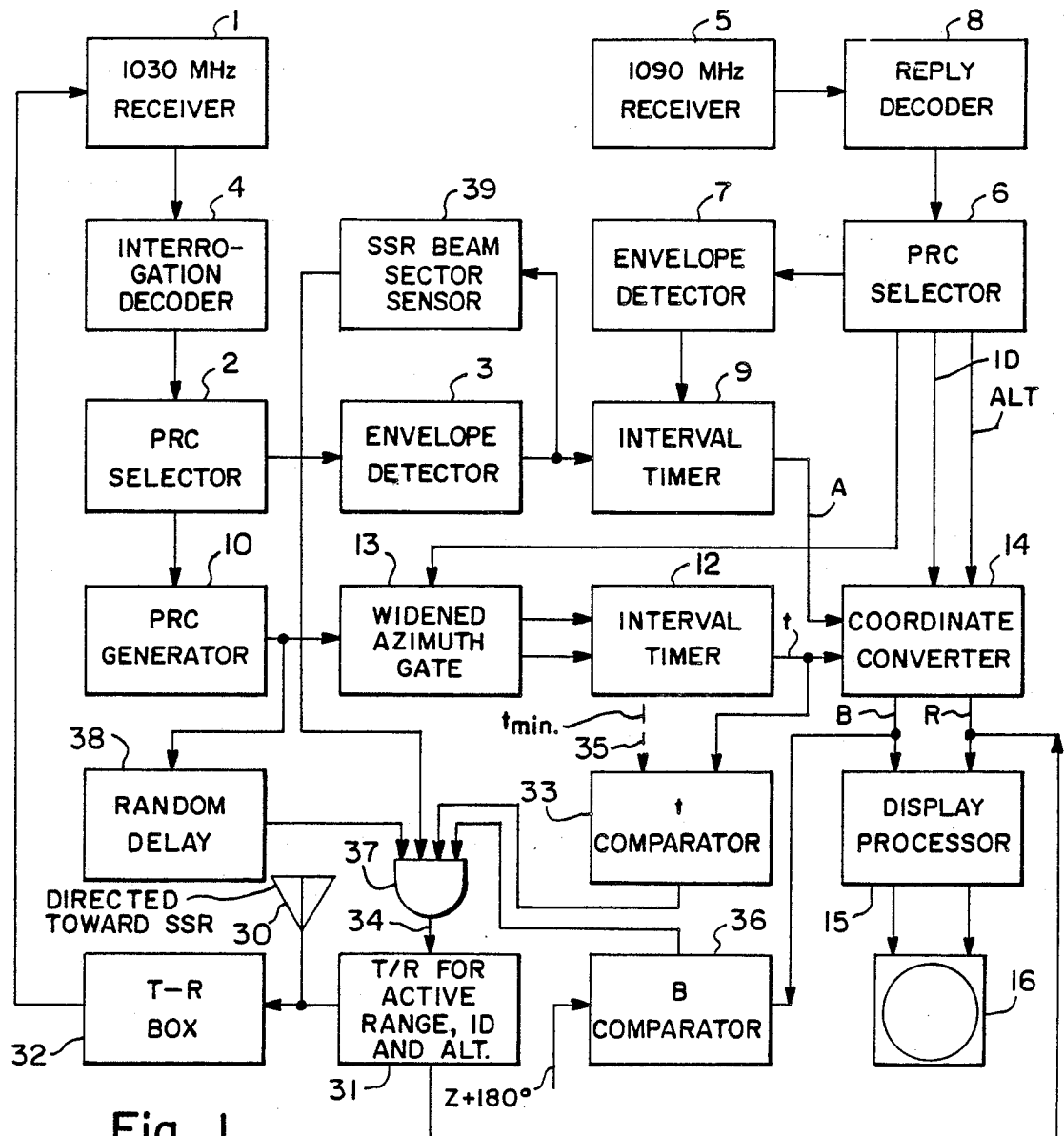
FIG. 1 is a block diagram showing an embodiment of the invention.
FIG. 2 is a geometrical diagram used in explaining the operation of the apparatus of FIG. 1.

Referring to FIG. 1, the elements designated 1-10 and 12-16 are the same as the similarly designated elements shown in FIG. 1 of U.S. Pat. No. 4,115,771 and described from column 2, line 22 to column 3, line 66. The elements 11, 17, 18 and 20-22 of said patent and their functions are omitted in this instance, as they form no part of the present invention.

A directional antenna 30 is designed to provide a radiated beam of, for example, thirty degrees in width, pointed at an actual SSR. An active range measuring device 31 is coupled to the antenna 30. The device 31 includes a 1030 MHz transmitter similar to that of an SSR but of much lower power, an interrogation encoder, a 1090 MHz receiver and a reply decoder, all similar to those of a standard SSR, but designed to operate at a much lower interrogation rate, for example one tenth to one one hundredth that of a standard SSR.

The antenna 30 is also coupled by way of a T-R box 32 to the 1030 MHz receiver 1 to discriminate against multipath propagation and to increase the strength of interrogations received from the actual SSR.

A comparator device 33 receives the output t of the interval timer 12, and provides a control signal to an AND gate 37 whenever the time interval represented by t becomes less than a predetermined value $t_{min}$, say ten microseconds. Said value may be made adjustable, as indicated by the dash line arrow 35.

A second comparator device 36 receives an output B from the coordinate converter 14 representing the bearing of a target from the virtual SSR, and provides a second control signal to gate 37 whenever B approaches the bearing of the actual SSR from the virtual SSR within, for example, 15°. Each pulse from the PRC generator 10 is applied as a control input to AND gate 37 by way of a device 38 designed to introduce a randomly varying delay of say 1000 to 1500 microseconds. A pulse from the envelope detector 3 occurs once during each rotation of the SSR main beam, when it points at the virtual SSR. Such pulses are applied to an SSR beam sector sensor 39, which includes an interval timer like timer 9 and a flip-flop arranged to produce an output only while the SSR beam is pointed away from the virtual SSR by ninety degrees or more, for example. Such output from the sensor 39 is also applied to AND gate 37 as a control signal. Whenever all such control signals are present, the AND gate 37 produces an output on line 34, triggering the active ranging device 31 to operate repeatedly, providing representations of range, ID and altitude of appropriately transponder-equipped targets within the coverage of antenna 30. Such representations of range and altitude, coordinated or tagged in each case with the target identity (ID), are applied to the display processor 15 in addition to the similar representations regarding other targets produced by the coordinate converter 14, and in the same format.

Referring to FIG. 2, the apparatus of FIG. 1 is located at point V, at the site of a small general aviation airport, for example. The distance D and bearing Z of V from a remote actual SSR are known, as from a survey map. T represents the position of a transponder equipped aircraft in the neighborhood of the line D between the SSR and V. R is the range and B is the bearing of T from V. X is the range of T from the SSR. A is the differential azimuth, the difference between the directions of V and T from the SSR. X is the range of T from the SSR. The situation illustrated herein is quite different from that shown in FIG. 2 of said U.S. Pat. No. 4,115,771 and the terminology describing it is somewhat different, to facilitate explanation of the operation of the present invention.

Each reply received at V from the transponder at T follows the reception of the interrogation from the SSR that elicited such reply, by the time interval t, denoted as the differential time of arrival. With systemic delays compensated or accounted for, $$ct = R + X - D,$$

where c is the speed of radio propagation.

As the radar beam from the SSR rotates clockwise, it first illuminates the site V, and after some time interval, the transponder at T. The output of the interval timer 9 of FIG. 1 is a measure of the differential azimuth A.

The geometry of FIG. 2 defines the location of T as a point on an ellipse E having one focus at the SSR and the other focus at V. The major axis, of length $D+ct$, is at an angle Z with respect to the reference direction N, and the eccentricity is $D/(D+ct)$. The aircraft T is on the ellipse E at the end of the line X extending radially from the SSR at the differential azimuth angle A from the line D. Under most circumstances, the position of T is unequivocally determinable from the known quantities D and Z and the measured quantities A and t, as in U.S. Pat. No. 4,115,771.

On rare occasions, however, a transponder equipped craft T may be located on the line D, at some position between V and the SSR. Then $X+R$ is equal to D, and t is zero. The coordinate converter 14 of FIG. 1, lacking a finite value of t, cannot determine R. The target will be detected; information as to its ID, altitude and bearing B will be displayed as usual, but the range will not. When T is not on line D but close to it, t approaches zero and the accuracy of determination of R deteriorates as lines X and R (FIG. 2) become more nearly parallel to D.

Usually the target will be moving more or less transversely of line D, and the deficiency of range information will not persist, and may not even be noticeable, particularly when the display processor 15 is equipped with some known type of track predictive means such as a Kalman filter. In the rare instance when an aircraft continues to fly along or closely parallel to line D, the loss of range information could become dangerous, if another aircraft or some obstruction is in the vicinity of line D and at the same altitude.

One criterion of range information deficiency is a decrease of t below $t_{min}$; another is the approach of the target bearing B in to within, say 15° of that of line D, as viewed from V. The use of the first criterion in the case of a target at point T is clear from the foregoing explanation. The use of the second is to prevent active ranging operation when it is not needed, thereby further minimizing the possibility of interference with the standard ATCRBS.

Consider a target at point T 1, near V. Although t may be less than $t_{min}$, the angular relationship between X and R enables accurate computation of range by the coordinate converter 14 passively, as in U.S. Pat. No. 4,115,711. In this case active range measurement by the device 31 is not needed. The B comparator 36 produces no output, hence the AND gate provides no trigger control signal, and the device 31 remains inactive.

When both the t and B criteria are met, as in the case of a target at a point T near the line D, both comparators provide control inputs to the gate 37. If the situation continues for more than a few seconds, the beam sector selector 39 provides a third input to gate 37, and the delay device 38 provides a fourth, providing a trigger control signal from the gate 37 to activate the ranging device 31.

One of the virtues of the system of U.S. Pat. No. 4,115,711 is that it transmits no signals at any time, and therefore cannot interfere with the existing ATCRBS. The system of the present invention will occasionally transmit, only briefly, upon passive detection of the presence of a target, at a very low repetition rate, and at a low power level about the same as that of the transmitter of a standard transponder, and only in a sector about 30° wide. Any interference that may occur will be of short duration and generally not noticeable. The possibility of interference is minimized by inhibiting transmissions except at relatively long random intervals after the synthetic P3 pulses from the PRC generator 10, while the SSR beam is pointed away from the virtual SSR.

When two or more targets are simultaneously present in the coverage area of antenna 30, they will respond individually to each interrogation transmitted by device 31. If they are at nearly the same range from V, their replies will overlap, or "garble". This effect may be countered by providing device 31 with degarbling means of the type described in Chapter 38 of Radar Handbook, edited by Merrill I. Skolnik and published by McGraw-Hill Book Company, N.Y.

To separate the responses from targets at slightly different bearings, the antenna 30 may be designed in known manner to operate alternately in two overlapping lobes displaced on opposite sides of line D, for transmission of interrogations and receiving their replies first in one lobe several degrees on one side of line D and then in the other lobe several degrees on the other side of line D. It is also contemplated that the power of the interrogation transmitter be changed on a systematic schedule to reduce garbling. This technique, known as "whisper-shout", is described in RTCA Paper No. 420-86/SC147-213, published Sept. 1986 by the Radio Technical Commission for Aeronautics, 1425 K Street, Washington, D.C. 20005, on pages 17–20.

We claim:

1. In a system for indicating the position of a transponder with respect to a reference position at a known location within the service area of a secondary surveillance radar (SSR) by receiving at said location interrogations from said SSR and replies from the transponder and determining the position of the transponder from the time relationships between said received interrogations and replies, the improvement comprising, at said reference position:
   (a) an antenna;
   (b) active range measuring transmitter-receiver means coupled to said antenna;
   (c) means for providing a control output in response to the presence of the transponder in an area on or close to a line between the reference position and the SSR which is geometrically unfavorable to passive determination of its range; and
   (d) means responsive to said control output to actuate said active range measuring means briefly and intermittently.

2. The system of claim 1, wherein said antenna a is directive, pointed at said SSR, and is also coupled to means for receiving interrogations from said SSR.

3. The system of claim 1, wherein said means c for providing a control output includes comparator means for producing an output in response to a decrease in the differential time of arrival t below a predetermined $value_{min}$.

4. The system of claim 3, wherein said means c further includes a second comparator means for producing an output in response to a decrease in the difference in bearing of the transponder from that of the SSR, as viewed from the reference position, below a predetermined value.

5. The system of claim 4, wherein said means c further includes means for inhibiting a control signal output in the absence of output from either of said comparator means.

6. The system of claim 2, further including means for alternately pointing the beam axis of said antenna several degrees first to one side and then to the other of the line between said reference position and the SSR.

7. The system of claim 1, wherein said active range measuring means includes reply pulse degarbling equipment.

8. The apparatus of claim 1, further including means for varying the transmitter power level of said active range measuring means in successive interrogations.

9. A method of determining the position of a transponder with respect to a reference position at a known location within the service area of a secondary surveillance radar (SSR) by receiving at said location interrogations from said SSR and replies from the transponder and determining the position of the transponder from the time relationships between said received interrogations and replies, further including the steps of (a) sensing from said time relationships the presence of a transponder in an area on or close to a line between the reference position and the SSR which is geometrically unfavorable to passive determination of its range, and (b) transmitting interrogations from and receiving replies at said reference position for active measurement of the range of such transponder in response to said sensing.

10. The method of claim 9, wherein said step b is performed in a directive pattern pointed toward the SSR.

11. The method of claim 9, wherein step a includes sensing a decrease of differential time of arrival t below a predetermined value $t_{min}$.

12. The method of claim 11, further including sensing a decrease in the difference in bearing of the transponder from that of the SSR, as viewed from the reference position, below a predetermined value.

13. The method of claim 12, further including the step of inhibiting transmission of interrogations from said reference position in the absence of concurrent sensing of both said decreases below said predetermined values.

14. The method of claim 13, further including the step of inhibiting transmission of said interrogations when the SSR beam is pointing within a sector that includes the location of the virtual SSR.

15. The method of claim 13, further including the step of inhibiting said interrogations during an interval of 1000 to 1500 microseconds following each P3 pulse.

16. The method of claim 15, further including the step of randomly varying the length of said interval.

* * * * *